(12) United States Patent
Uramoto et al.

(10) Patent No.: US 9,831,704 B2
(45) Date of Patent: Nov. 28, 2017

(54) POWER FEEDING DEVICE, POWER FEEDING METHOD, AND POWER FEEDING SYSTEM

(75) Inventors: Yoichi Uramoto, Kanagawa (JP); Masayuki Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 113 days.

(21) Appl. No.: 13/137,843

(22) Filed: Sep. 16, 2011

(65) Prior Publication Data

US 2012/0091989 A1   Apr. 19, 2012

(30) Foreign Application Priority Data

Oct. 15, 2010   (JP) .................................. 2010-232813

(51) Int. Cl.
*H02J 7/02*   (2016.01)
*H02J 5/00*   (2016.01)

(52) U.S. Cl.
CPC .............. *H02J 7/025* (2013.01); *H02J 5/005* (2013.01)

(58) Field of Classification Search
CPC ........ H02J 7/025; H02J 5/005; H04B 5/0081; H04B 5/0037; H01F 38/14
USPC ....................... 324/76.75, 654, 655, 658, 686
See application file for complete search history.

(56) References Cited

U.S. PATENT DOCUMENTS

| | | | |
|---|---|---|---|
| 6,750,659 B2 * | 6/2004 | Murphy | 324/686 |
| 2007/0126393 A1 | 6/2007 | Bersenev | |
| 2008/0061733 A1 * | 3/2008 | Toya | 320/103 |
| 2008/0154178 A1 * | 6/2008 | Carter | A61N 1/044 604/20 |
| 2008/0164839 A1 | 7/2008 | Kato et al. | |
| 2008/0239581 A1 * | 10/2008 | Ikai | G11B 5/3136 360/272 |
| 2009/0224723 A1 * | 9/2009 | Tanabe | 320/108 |
| 2009/0267558 A1 * | 10/2009 | Jung | H02J 5/005 320/108 |
| 2010/0055928 A1 * | 3/2010 | Randall | G06F 1/1632 439/1 |
| 2010/0060300 A1 * | 3/2010 | Muller et al. | 324/686 |
| 2010/0072828 A1 * | 3/2010 | Kinoshita | H01H 9/563 307/125 |
| 2010/0084918 A1 | 4/2010 | Fells et al. | |

(Continued)

FOREIGN PATENT DOCUMENTS

| | | |
|---|---|---|
| EP | 1 432 097 A1 | 6/2004 |
| EP | 1 689 062 A1 | 8/2006 |

(Continued)

OTHER PUBLICATIONS

Dictionary of Scientific and Technical Terms, Sixth Edition, McGraw-Hill, 2002, p. 456.*

(Continued)

*Primary Examiner* — Son Le
*Assistant Examiner* — Dustin Dickinson
(74) *Attorney, Agent, or Firm* — Chip Law Group

(57) ABSTRACT

Disclosed herein is a power feeding device including: power transmitting section which transmits electric power by way of a magnetic field; a set of first and second electrodes which are spaced from each other; a power supply which applies a voltage between the first and second electrodes; and a detector which detects whether foreign matter is present on the power transmitting section or not based on the voltage applied by the power supply.

25 Claims, 13 Drawing Sheets

(56) References Cited

U.S. PATENT DOCUMENTS

| | | | |
|---|---|---|---|
| 2010/0123451 A1* | 5/2010 | Freer | H02J 5/005 |
| | | | 323/356 |
| 2010/0228833 A1* | 9/2010 | Duquette | G06Q 40/04 |
| | | | 709/207 |
| 2010/0292945 A1* | 11/2010 | Reynolds et al. | 702/65 |
| 2010/0328044 A1* | 12/2010 | Waffenschmidt et al. | 340/10.4 |
| 2011/0050164 A1* | 3/2011 | Partovi et al. | 320/108 |
| 2011/0050191 A1* | 3/2011 | Tsuji | H01F 17/0006 |
| | | | 323/282 |
| 2011/0221387 A1* | 9/2011 | Steigerwald et al. | 320/108 |
| 2011/0248729 A2 | 10/2011 | Mueller et al. | |

FOREIGN PATENT DOCUMENTS

| | | |
|---|---|---|
| JP | 07-16553 | 3/1995 |
| JP | 2001-350592 A | 12/2001 |
| JP | 2002-034169 | 1/2002 |
| JP | 2006-200994 A | 8/2006 |
| JP | 2008-172874 | 7/2008 |
| JP | 2008-525063 A | 7/2008 |
| JP | 2008-295176 A | 12/2008 |
| JP | 2009-118569 A | 5/2009 |
| JP | 2009-124192 A | 6/2009 |
| WO | WO-2010/040015 A2 | 4/2010 |

OTHER PUBLICATIONS

Extended European Search Report dated Mar. 6, 2012 for corresponding European Application No. 11 184 111.0.
Japanese Office Action dated May 14, 2014 for corresponding Japanese Application No. 2010-232813.
Chinese Office Action dated Aug. 29, 2014 for corresponding Chinese Application No. 201110301370.5.

* cited by examiner

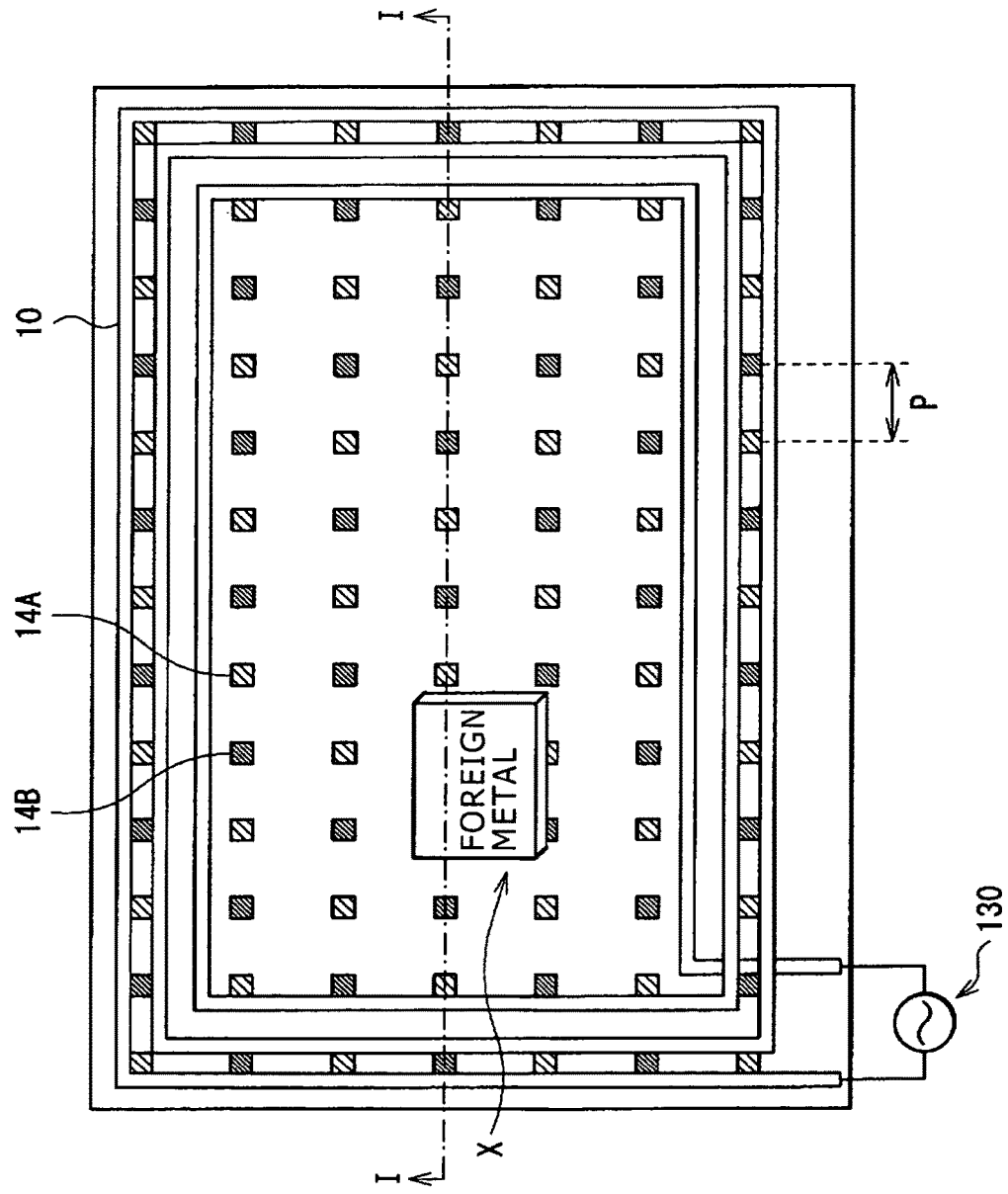

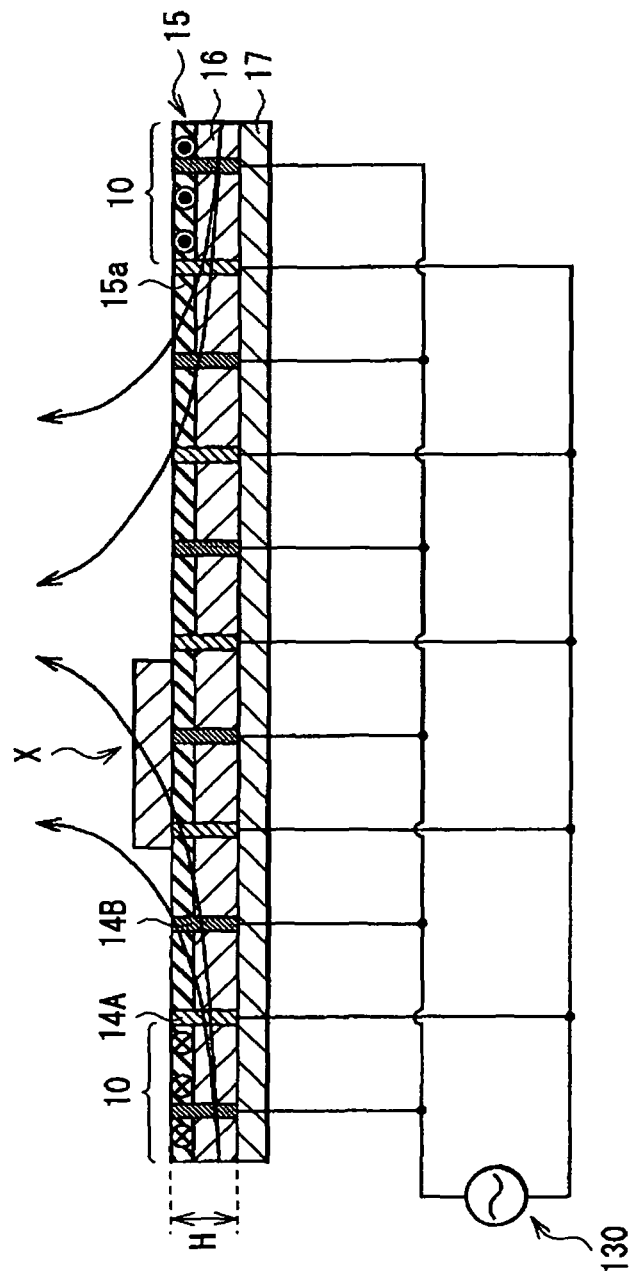

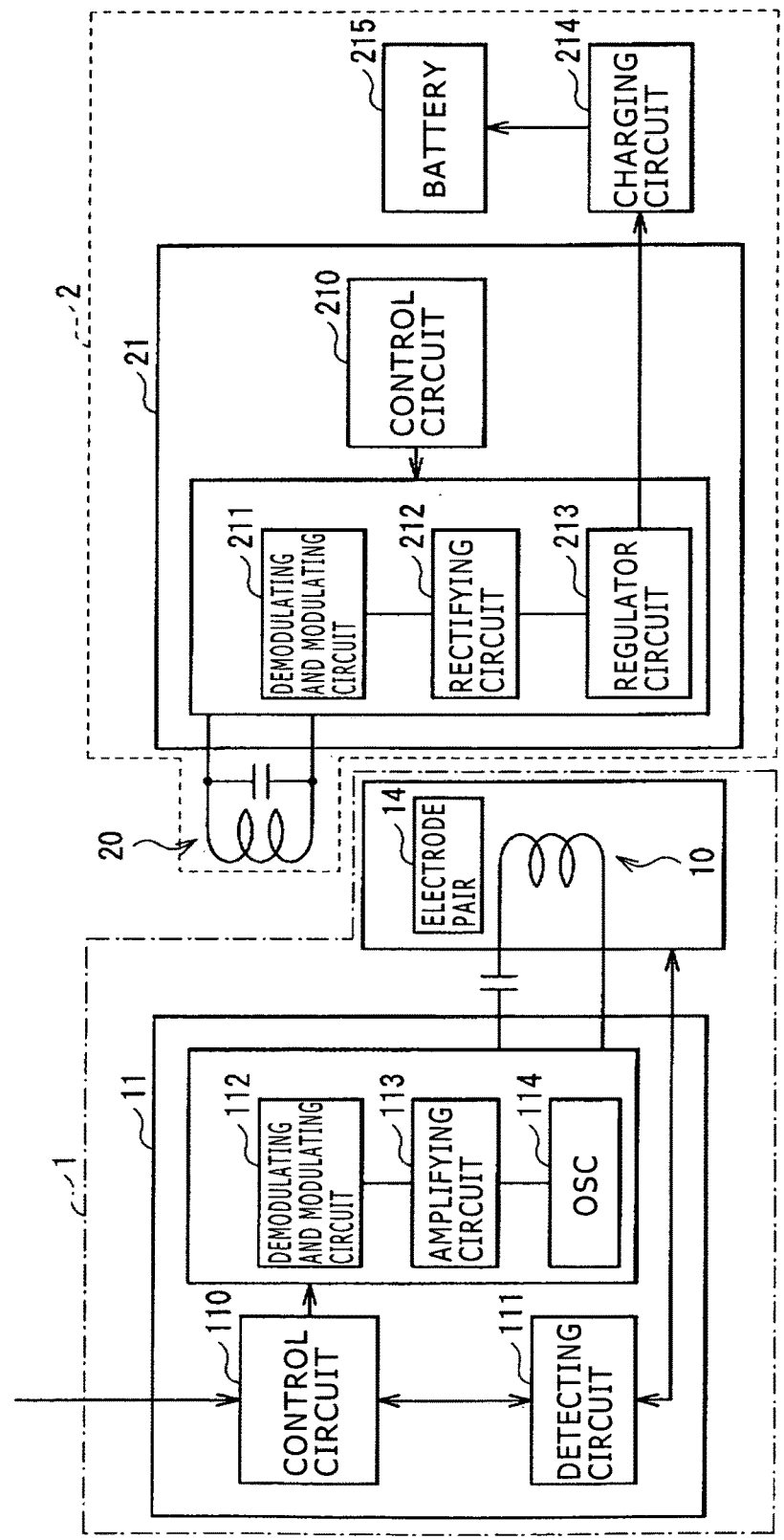

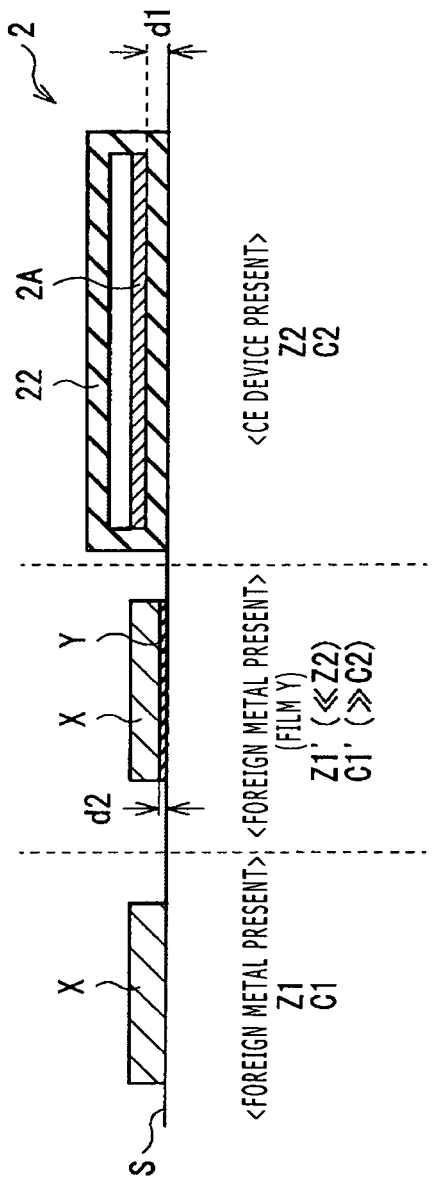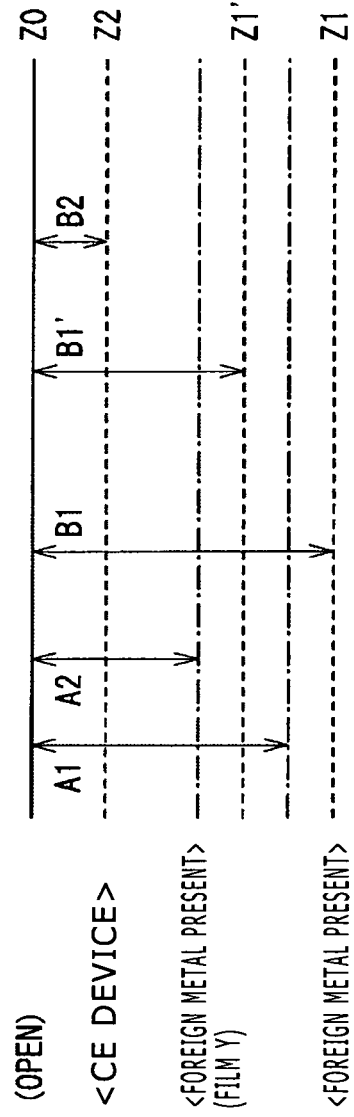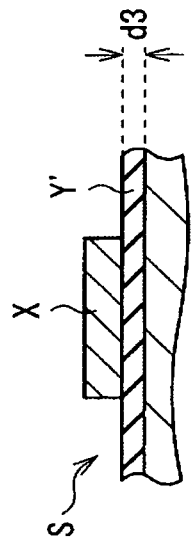
FIG. 7A
FIG. 7B
FIG. 7C

POWER FEEDING DEVICE, POWER FEEDING METHOD, AND POWER FEEDING SYSTEM

BACKGROUND

The present disclosure relates to a power feeding device, a power feeding method, and a power feeding system which charge an electronic device such as a mobile phone or the like in a contactless fashion.

In recent years, much attention has been paid to power feeding devices, referred to as contactless power feeding devices or wireless power feeding devices, which supply CE (Consumer Electronics) devices such as mobile phones, portable music players, etc. with electric power in a contactless fashion by way of electromagnetic induction, magnetic resonance, or the like. According to the contactless power feeding scheme, the connector of a power supply device such as an AC adapter does not need to be inserted into or connected to a CE device to charge the CE device. Rather, a CE device starts being charged simply when it is placed on a tray-type contactless power feeding device, which is also called a charging tray, for example. Consequently, no physical terminal connection is necessary between the CE device and the power feeding device.

Since a CE device starts being charged simply when it is placed on a charging tray, the user of the CE device is subject to a less burden in charging the CE device. One problem with the charging tray, however, is that an object other than the CE device to be charged, e.g., foreign matter such as a coin or the like, hereinafter referred to as "foreign metal," could easily be placed on the charging tray. When foreign metal is placed on the charging tray, the foreign metal tends to be heated by the charging tray.

There have been proposed various ways to detect foreign metal on a charging tray in order to stop the charging process of the charging tray if the foreign metal is placed on the charging tray. According to one proposal, for example, a temperature sensor is used to detect the temperature of an object which is placed on a charging tray, and the object is determined as being foreign matter if an abnormal temperature rise is detected (see, for example, Japanese Patent Laid-Open No. 2008-172874 (hereinafter referred to as Patent Document 1)). According to another proposal, a load on a charging tray is varied in a predetermine pattern to detect an overload (see, for example, Japanese Patent Laid-Open No. 2002-34169 (hereinafter referred to as Patent Document 1)).

SUMMARY

According to the process disclosed in Patent Document 1, since the object is determined as foreign matter based on a temperature rise thereof, it is not possible to prevent the foreign matter itself from being heated. Therefore, the disclosed process does not provide a fundamental solution to the problem of the heating of the foreign matter. According to the process disclosed in Patent Document 2, it is difficult to accurately determine whether the load variation is caused by the CE device or foreign metal. Although the various processes for detecting foreign matter have been proposed in the art, as described above, there have been demands for a power feeding device incorporating a new foreign matter detector which is completely different from the processes that have been proposed heretofore.

Accordingly, it is desirable to provide a power feeding device, a power feeding method, and a power feeding system which accurately detect foreign matter that is different from an object to be supplied with electric power for preventing the foreign matter from being unduly overheated at the time the object is supplied with electric power by way of a magnetic field.

According to an embodiment of the present disclosure, there is provided a power feeding device including a power transmitting section which transmits electric power by way of a magnetic field, at least a set of first and second electrodes which are spaced from each other, a power supply which applies a voltage between the first and second electrodes, and a detector which detects whether foreign matter is present on the power transmitting section or not based on the voltage applied by the power supply. The foreign matter refers to an object, such as a metal object, which is different from an object such as an electronic device that is to be supplied with electric power from the power transmitting section.

According to an embodiment of the present disclosure, there is also provided a power feeding method including transmitting electric power from a power transmitting section by way of a magnetic field, and applying a voltage between at least a set of first and second electrodes which are spaced from each other, to detect whether foreign matter is present on the power transmitting section or not.

According to an embodiment of the present disclosure, there is also provided a power feeding system including at least one electronic device and a power feeding device for transmitting electric power to the at least one electronic device.

When a voltage is applied between the first and second electrodes, if foreign matter is placed across the first and second electrodes, it causes a short circuit or capacitive coupling between the first and second electrodes. Therefore, foreign matter that is placed across the first and second electrodes can be detected based on a short circuit or capacitive coupling that occurs between the first and second electrodes.

Specifically, when a short circuit or capacitive coupling is caused between the first and second electrodes, it changes a parameter such as an impedance, a current, or a voltage between the first and second electrodes. The change in the parameter is compared with a preset threshold value to detect the foreign matter. The foreign matter, which is different from an object such as an electronic device that is to be supplied with electric power from the power transmitting section, can thus be detected accurately. Upon detection of the foreign matter, the supply of electric power from the power transmitting section is stopped or reduced to prevent the foreign matter from being unduly overheated.

BRIEF DESCRIPTION OF THE DRAWINGS

FIG. 2 is a plan view of the charging tray shown in FIG. 1;

FIG. 3 is a cross-sectional view of the charging tray shown in FIG. 1;

FIG. 4 is a functional block diagram of the charging tray and the mobile phone shown in FIG. 1;

FIG. 5B a view showing the relationship between parameter changes and a threshold value;

FIGS. 7A through 7C are views illustrative of a process of detecting foreign metal according to a first modification, FIG. 7A being a view showing the manner in which objects are placed on the upper surface of the charging tray; FIG. 7B a view showing the relationship between parameter changes and threshold values; and FIG. 7C a view showing a tray structure including a film disposed on the upper surface of the charging tray, i.e., on electrodes;

DETAILED DESCRIPTION OF THE PREFERRED EMBODIMENTS

The present disclosure will be described in detail below with reference to the drawings. The present disclosure will be described according to the following sequence:
1. Exemplary embodiment (a charging tray with a matrix of alternate discrete dot-shaped positive and negative electrodes);
2. First modification (a process of detecting foreign matter using two threshold values);
3. Second modification (a process of detecting foreign matter using a resonant circuit);
4. Third modification (charging trays with matrixes of discrete linearly shaped positive and negative electrodes);
5. Fourth modification (a charging tray with an interdigitating pattern of combtoothed positive and negative electrodes);
6. Fifth modification (a charging tray with a concentric pattern of alternate horseshoe-shaped, i.e., substantially U-shaped or ring-shaped, positive and negative electrodes); and
7. Sixth modification (an electronic device (CE device) including a metal layer with insulative teeth disposed thereon.

Exemplary Embodiment

Figure 1:
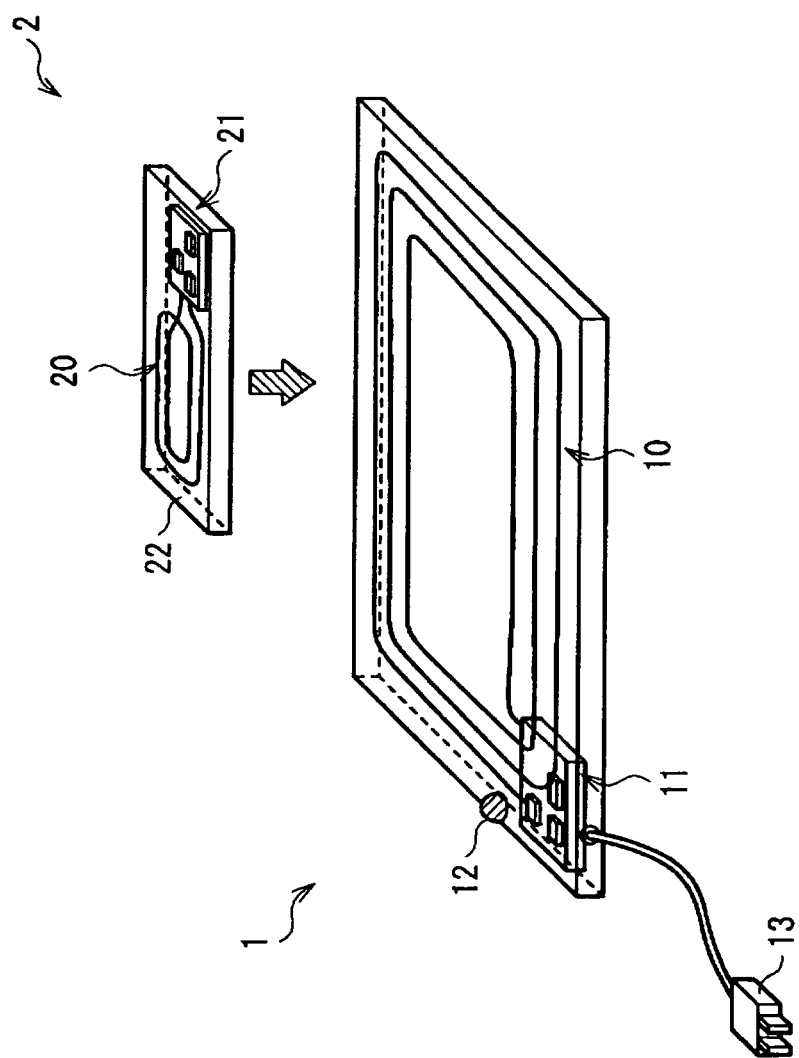
FIG. 1 is a perspective view of a charging tray and a mobile phone of a power feeding system according to an embodiment the present disclosure.

Overall Structure:

FIG. 1 is a perspective view of a power feeding device (charging tray 1) and an electronic device (mobile phone 2) of a power feeding system according to an embodiment of the present disclosure. The power feeding system includes the charging tray 1 and the mobile phone 2. The charging tray 1 is a contactless power feeding device for charging an electronic device (CE device) such as the mobile phone 2 in a contactless fashion when the mobile phone 2 is placed on or near the upper surface of the charging tray 1. A power feeding method according to the embodiment of the present disclosure will also be described below in connection with the power feeding method as it is carried out as a power feeding process of the charging tray 1.

The charging tray 1 includes a primary coil 10 for transmitting electric power by way of magnetic field, a circuit section 11, including a detecting circuit 111 described later, for energizing the primary coil 10, and a power supply plug 13 for connecting to an external AC power supply, for example. The charging tray 1 also includes a warning lamp 12 for indicating (presenting) to the user whether foreign matter is detected or not. Although details are described later, the charging tray 1 further has a circuit board 17, which includes the circuit section 11, a magnetic layer 16 disposed on the circuit board 17, and an antenna pattern layer 15 disposed on the magnetic layer 16. The primary coil 10 is disposed in the antenna pattern layer 15. The circuit board 17, the magnetic layer 16, and the antenna pattern layer 15 may be housed in a casing or may be coated with a resin layer. The charging tray 1 includes an electrode pattern, to be described in detail later, for detecting foreign matter.

The mobile phone 2 includes a secondary coil 20 housed in a casing 22. The secondary coil 20 is paired with the primary coil 10 of the charging tray 1. The charging tray 1 supplies electric power to the mobile phone 2 by way of electromagnetic induction or magnetic resonance between the primary coil 10 and the secondary coil 20. The mobile phone 2 also includes a circuit section 21 for energizing the secondary coil 20.

Structural Details of Charging Tray 1:

FIG. 2 is a plan view showing a planar configuration of the charging tray 1, and FIG. 3 is a cross-sectional view taken along line I-I of FIG. 2. As shown in FIG. 3, the charging tray 1 includes the magnetic layer 16 and the antenna pattern layer 15 that are successively disposed on the circuit board 17. The antenna pattern layer 15 (the primary coil 10), the magnetic layer 16, and the circuit board 17 jointly serve as a specific example of a power transmitting section according to the embodiment of the present disclosure. The antenna pattern layer 15 is disposed on the side of an upper surface (radiating surface) of the charging tray 1, and includes the primary coil 10. The primary coil 10, which is wound of a predetermined number of turns, is spirally shaped along the upper surface of the charging tray 1. The primary coil 10 is embedded in, i.e., encased by, a resin layer 15a which is part of the antenna pattern layer 15. An AC power supply 130 applies an AC voltage across the primary coil 10 through the circuit section 11 and the power supply plug 13 (not shown in FIGS. 2 and 3) to radiate an electromagnetic wave, i.e., generate a magnetic field, toward the in-plane center of the charging tray 1 near the upper surface thereof along the arrows in FIG. 3. The primary coil 10 may have its upper surface exposed from the resin layer 15a or covered with the resin layer 15a. Alternatively, the primary coil 10 may be disposed on a board, not shown. The board and the resin layer 15a may be made of a material which does not adversely affect magnetic field lines.

The magnetic layer 16 has a function to keep the antenna pattern layer 15 and the circuit board 17 magnetically isolated from each other. The magnetic layer 16 is made of a material of high relative permeability, such as iron (Fe)-based metal, ferrite, or the like, which should preferably be magnetically unsaturable or be difficult to magnetically saturate.

The circuit board 17, which is an IC (Integrated Circuit) board, for example, has the circuit section 11 for energizing the primary coil 10, the circuit section 11 including the detecting circuit 111. Details, of the circuit section 11 and the circuit section 21 of the mobile phone 2 will be described later.

The charging tray 1 includes an electrode pattern for detecting foreign metal X. The electrode pattern includes a plurality of positive electrodes 14A and a plurality of negative electrodes 14B, or a plurality of sets of positive electrodes 14A and negative electrodes 14B, arranged in rows and columns at regularly spaced intervals. The positive electrodes 14A and the negative electrodes 14B are alternately arranged such that any two of the positive electrodes 14A are not disposed adjacent to each other along the rows and columns and any two of the negative electrodes 14B are not disposed adjacent to each other along the rows and columns.

Each of the positive electrodes 14A and the negative electrodes 14B is of a dot shape in a plane parallel to the upper surface of the charging tray 1. The positive electrodes 14A and the negative electrodes 14B are spaced at a predetermined pitch P in the range from 5 mm to 20 mm.

The positive electrodes 14A and the negative electrodes 14B extend through the antenna pattern layer 15 and at least a portion of the magnetic layer 16 in a cross-sectional plane perpendicular to the upper surface of the charging tray 1. The positive electrodes 14A and the negative electrodes 14B have ends exposed on the upper surface of the antenna pattern layer 15, i.e., the upper surface of the charging tray 1. Each of the positive electrodes 14A and the negative electrodes 14B is in the shape of a rod or pin having a height H. The positive electrodes 14A and the negative electrodes 14B are supplied with the AC voltage from the AC power supply 130 through the circuit section 11 and the power supply plug 13.

Circuit Arrangement:

FIG. 4 is a functional block diagram showing major components of the charging tray 1 and the mobile phone 2. The circuit section 11 of the charging tray 1 includes a control circuit 110, a detecting circuit 111, a demodulating and modulating circuit 112, an amplifying circuit 113, and an OSC (oscillator) 114.

The detecting circuit 111 is a circuit for detecting foreign metal on the upper surface of the charging tray 1. The detecting circuit 111 applies a voltage between electrode pairs 14, i.e., the sets of positive electrodes 14A and negative electrodes 14B, and determines whether there is foreign metal on the upper surface of the charging tray 1 or not based on at least one of parameters representing electric properties which include the impedance, current, and voltage between the positive electrodes 14A and the negative electrodes 14B. Specifically, as described in greater detail later, the detecting circuit 111 holds a threshold value with respect to a change in at least one of the above parameters, compares the threshold value and a change in the parameter based on the applied voltage with each other, and detects whether there is foreign metal on the upper surface of the charging tray 1 or not based on the comparison between the threshold value and the change in the parameter. The detecting circuit 111 serves as a specific example of a detecting section according to the embodiment of the present disclosure.

The control circuit 110 controls the detecting circuit 111, the demodulating and modulating circuit 112, the amplifying circuit 113, the OSC 114, and the warning lamp 12. The control circuit 110 may be a microcomputer, for example. The control circuit 110 supplies AC power supplied from the AC power supply 130 to the detecting circuit 111 and the primary coil 10. The control circuit 110 also starts or continues to charge the mobile phone 2, stops charging the mobile phone 2, or reduces the supplied power in charging the mobile phone 2 based on the detection from the detecting circuit 111. Specifically, if the detecting circuit 111 detects foreign metal on the upper surface of the charging tray 1, then the control circuit 110 stops charging the mobile phone 2 or reduces the supplied power, and energizes mechanism not shown (the warning lamp 12 shown in FIG. 1, for example), to give the user a warning. The control circuit 110 and a control circuit 210, to be described later, of the mobile phone 2 may hold ID (Identification: individual identification) information for authenticating or identifying the primary coil 10 and the secondary coil 20, respectively, when the primary coil 10 and the secondary coil 20 are brought closely to each other.

The circuit section 21 of the mobile phone 2 includes a control circuit 210, a demodulating and modulating circuit 211, a rectifying circuit 212, and a regulator circuit 213. The rectifying circuit 212 converts AC power received from the charging tray 1 into DC power. The regulator circuit 213 converts the DC power from the rectifying circuit 212 into a predetermined DC voltage for thereby preventing a battery 215 of the mobile phone 2 from being overcharged. The electric power generated by the circuit section 21 is supplied through a charging circuit 214 to the battery 215, which may be a secondary battery, for example. The control circuit 210 controls the demodulating and modulating circuit 211, the rectifying circuit 212, and the regulator circuit 213, and may be a microcomputer, for example.

Operation:

Contactless Power Feeding Process:

According to the present exemplary embodiment, the control circuit 110 of the charging tray 1 applies an AC voltage from the AC power supply 130 through the circuit section 11 (that is, the control circuit 110, demodulating and modulating circuit 112, amplifying circuit 113, and OSC 114) to the primary coil 10. The primary coil 10 then radiates an electromagnetic wave, i.e., generates a magnetic field, upwardly from the charging tray 1. If a CE device to be supplied with electric power, e.g., the mobile phone 2, is placed on or brought closely to the upper surface of the charging tray 1, then the primary coil 10 of the charging tray 1 and the secondary coil 20 of the mobile phone 2 are brought closely to each other in the vicinity of the upper surface of the charging tray 1. At this time, the electromagnetic wave may be radiated at all times or intermittently over time.

When the secondary coil 20 is placed closely to the primary coil 10 which generating a magnetic field, an electromotive force is induced across the secondary coil 20 by magnetic fluxes generated by the primary coil 10. Stated otherwise, magnetic field lines are generated across the primary coil 10 and the secondary coil 20 by way of electromagnetic induction or magnetic resonance, transmitting AC power from the primary coil 10 to the secondary coil 20. In the mobile phone 2, the AC power received by the secondary coil 20 is converted by the circuit section 21, which includes the demodulating and modulating circuit 211, the rectifying circuit 212, and the regulator circuit 213, into CC power. The DC power is then supplied through the charging circuit 214 to the battery 215. In this manner, the mobile phone 2 is charged.

According to the present exemplary embodiment, the mobile phone 2 easily starts to be charged, i.e., starts to be fed with electric power in a contactless fashion, simply when it is placed on or brought closely to the upper surface of the charging tray 1, rather than connecting a terminal thereof to an AC adapter or the like. Therefore, the user of the mobile phone 2 is subject to a less burden in charging the mobile phone 2. Although not shown, a plurality of CE devices or electronic devices such as mobile phones 2 may be placed on the charging tray 1, so that they can simultaneously be charged by the charging tray 1 in a contactless fashion. In other words, the power feeding system according to the embodiment of the present disclosure may include a single charging tray 1 and a plurality of electronic devices to be charged thereby.

If the control circuit 110 of the charging tray 1 and the control circuit 210 of the mobile phone 2 hold ID (Identification) information for authenticating or identifying the primary coil 10 and the secondary coil 20, then when the primary coil 10 and the secondary coil 20 are brought closely to each other, the control circuit 110 and the control circuit 210 may exchange the ID information. If the control circuit 110 authenticates the secondary coil 20 and the control circuit 210 authenticates the primary coil 10 based on the exchanged ID information, then the control circuit 110 may start or continue to charge the battery 215 of the mobile phone 2.

Detection of Foreign Metal:

Incidentally, in the charging tray 1 which transmits electric power by way of an electromagnetic induction, i.e., a magnetic field, if foreign matter such a coin or the like, hereinafter referred to as "foreign metal," is placed in the magnetic field generated by the primary coil 10, then an eddy current is generated in the foreign metal, tending to heat the foreign metal.

According to the present exemplary embodiment, the circuit section 11, or more specifically the control circuit 110 and the detecting circuit 111, detect the foreign metal, and stop a charging process, reduce the supplied electric power, or give the user a warning based on the detection of the foreign metal. Specifically, the detecting circuit 111 is controlled by the control circuit 110 to apply a voltage (AC voltage, in this case) between the positive electrodes 14A and the negative electrodes 14B in the charging tray 1, and measures a given parameter between the positive electrodes 14A and the negative electrodes 14B. The parameter may be at least one of the impedance, current, and voltage between the positive electrodes 14A and the negative electrodes 14B. The detecting circuit 111 then detects whether there is foreign metal or not based on a change in the parameter.

For example, the detecting circuit 111 has a threshold value A1 (first threshold value) for detecting foreign metal, for example, based on a change in the parameter. The detecting circuit 111 detects whether there is foreign metal or not based on a change in the parameter in comparison with the threshold value A1.

Figure 5A:
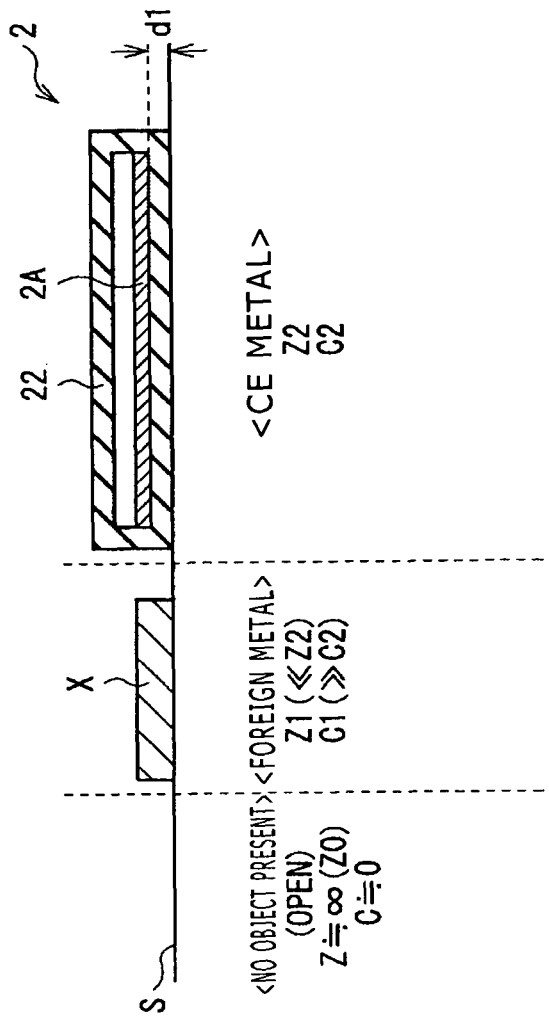
FIGS. 5A and 5B are views illustrative of a process of detecting foreign metal, FIG. 5A being a view showing the manner in which objects are placed on the upper surface of the charging tray.
Figure 5B:
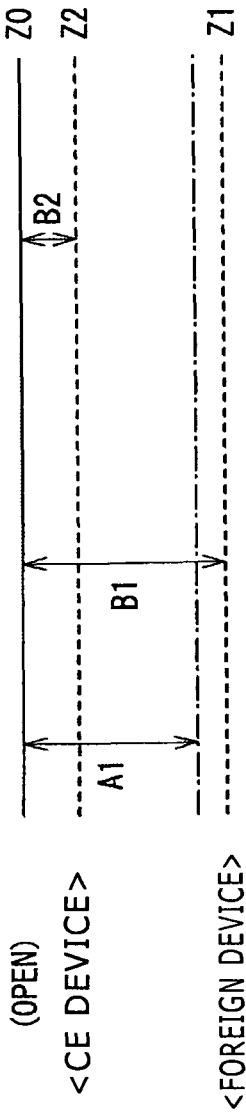

An example of a process of detecting foreign metal will be described below with reference to FIGS. 5A and 5B. In FIGS. 5A and 5B, it is assumed that the upper surface of the charging tray 1, i.e., the surface thereof which radiates the electromagnetic wave or the magnetic field, is indicated by S, and the charging tray 1 is in an OPEN state when no object is placed on the surface S. A change in the parameter is measured and the threshold value A1 is established with respect to the OPEN state. The impedance between the positive electrodes 14A and the negative electrodes 14B will be described as the parameter. However, the current or voltage between the positive electrodes 14A and the negative electrodes 14B may be used as the parameter, or the impedance, current, and voltage between the positive electrodes 14A and the negative electrodes 14B may be used in combination as the parameter. These parameters may be measured by various measuring units, e.g., an ammeter and a voltmeter, connected to a circuit made up of the positive electrodes 14A and the negative electrodes 14B, and measured data may be supplied from the measuring units to the detecting circuit 111. Based on the measured data, the detecting circuit 111 may calculate a change in the parameter, and compare the calculated change in the parameter with the threshold value A1, i.e., compare the magnitudes of the change and the threshold value A1 with each other.

As shown in FIG. 5A, when the charging tray 1 is in the OPEN state, the impedance Z between the positive electrode 14A and the negative electrode 14B is substantially $\infty$ (infinite) ($Z=Z0$), and the capacitance C (a capacitive component of the impedance Z) between the positive electrode 14A and the negative electrode 14B is substantially 0 (zero), i.e., of a very small value. When foreign metal X is placed on or closely to the surface S and positioned across a certain positive electrode 14A and a nearby negative electrode 14B, it causes a short circuit between the positive electrode 14A and the negative electrode 14B or forms a capacitive coupling between the positive electrode 14A and the negative electrode 14B as the AC voltage is applied to the positive electrodes 14A and the negative electrodes 14B. Therefore, the impedance Z between the positive electrode 14A and the negative electrode 14B drops to Z1, i.e., a change B1 occurs in the impedance Z, and the capacitance C increases to C1. The detecting circuit 111 compares the change B1 in the impedance Z with the threshold value A1, and determines that there is foreign metal on the surface S if the change B1 is equal to or greater than the threshold value A1.

When the mobile phone 2 (CE device) is placed on the surface S, since the mobile phone 2 includes a metal layer 2A (metal member) including the coil and the circuit board, the impedance Z and the capacitance C are slightly changed, i.e., a change B2 occurs in the impedance Z. However, the amount of change in this case (change B2) in the impedance Z is much smaller than the change B1 caused in the impedance Z by the foreign metal X, as shown in FIGS. 5A and 5B ($\infty(Z0)>Z2\gg Z1$). This is because the metal layer 2A is disposed in the casing 22, which is made of resin, of the CE device such as the mobile phone 2, the metal layer 2A is spaced from the surface S by at least a distance that is equal to the thickness d1 of the casing 22. It is easy to establish the threshold value A1 which differentiates between the change B1 caused in the impedance Z by the foreign metal X placed on the surface S and the change B2 caused in the impedance Z by the mobile phone 2 placed on the surface S. Therefore, the foreign metal X and the mobile phone 2, which are to be supplied with electric power, can accurately be told apart using the threshold value A1 without an error.

According to the present exemplary embodiment, as described above, the detecting circuit 111 applies a voltage between the positive electrodes 14A and the negative electrodes 14B arranged in a certain electrode pattern, and detects whether there is foreign metal X on the charging tray 1 or not based on a change in the parameter which may be the impedance, current, or voltage between the positive electrodes 14A and the negative electrodes 14B. If the detecting circuit 111 determines that there is foreign metal X on the charging tray 1, then the control circuit 110 stops supplying electric power to the primary coil 10, i.e., stops the charging process, or reduces the supplied electric power, i.e., cuts the electric power. The control circuit 110 also indicates to the user the fact that the foreign metal X is placed on the charging tray 1 or the foreign metal X is detected, by turning on the warning lamp 12 shown in FIG.

1 or displaying a warning message on a display screen not shown, and/or outputting a warning sound.

Effects of the Electrode Pattern:

Incidentally, in the present exemplary embodiment, the foreign matter is detected based on a short circuit or capacitive coupling that occurs between the electrode patterns (the positive electrodes 14A and the negative electrodes 14B) formed on the charging tray 1 as described above. Effects of the electrode pattern are described in detail below.

Figure 6:
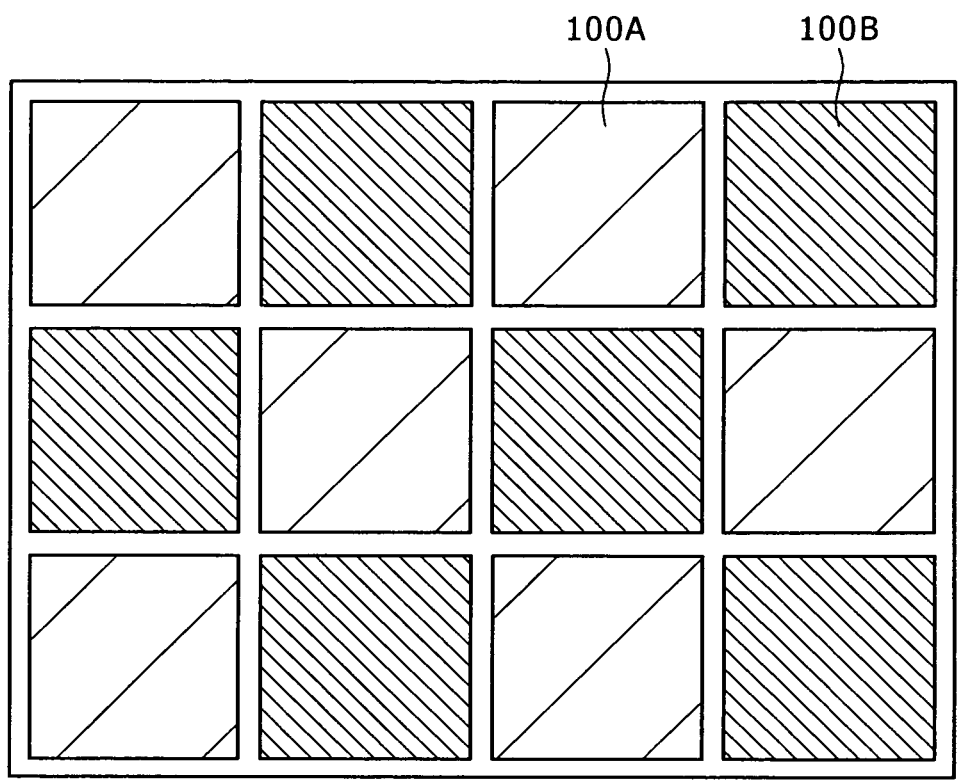
FIG. 6 is a plan view of an electrode pattern according to a comparative example.

FIG. 6 schematically shows a planar configuration of an electrode pattern according to a comparative example. According to the comparative example, the electrode pattern includes a plurality of positive electrodes 100A and a plurality of negative electrodes 100B arranged alternately in rows and columns at spaced intervals. Each of the positive electrodes 100A and the negative electrodes 100B is in the form of a planar solid electrode. The electrode pattern made up of the positive electrodes 100A and the negative electrodes 100B is effective to detect foreign metal placed thereon based on a short circuit or capacitive coupling between adjacent ones of the positive electrodes 100A and the negative electrodes 100B. However, since the positive electrodes 100A and the negative electrodes 100B are disposed in covering relation to the radiating side of the primary coil 10, they are liable to generate an eddy current.

According to the present exemplary embodiment, each of the positive electrodes 14A and the negative electrodes 14B is of a dot shape in a plane parallel to the upper surface of the charging tray 1, and the positive electrodes 14A and the negative electrodes 14B are spaced apart from each other. This electrode pattern makes it less liable to generate an eddy current, and more effective to direct magnetic field lines, i.e., magnetic fluxes, generated by the antenna pattern layer 15, across the primary coil 10.

While each of the positive electrodes 14A and the negative electrodes 14B is of a dot shape as viewed in plan, it is in the form of a pin as viewed in a cross-sectional plane perpendicular to the upper surface of the charging tray 1, extending through the antenna pattern layer 15 and the magnetic layer 16 and having ends exposed on the surface of the antenna pattern layer 15, i.e., the upper surface of the charging tray 1. The magnetic layer 16 prevents the magnetic field lines generated by the primary coil 10 of the antenna pattern layer 15 from penetrating the circuit board 17 toward its lower surface and hence from heating the circuit board 17.

According to the present exemplary embodiment, as described above, the positive electrodes 14A and the negative electrodes 14B are disposed at spaced intervals in the upper surface of the charging tray 1, and a voltage is applied between the positive electrodes 14A and the negative electrodes 14B. If foreign metal X is placed across a certain positive electrode 14A and a nearby negative electrode 14B, it causes a short circuit between the positive electrode 14A and the negative electrode 14B or forms a capacitive coupling between the positive electrode 14A and the negative electrode 14B, causing a change in the parameter such as the impedance between the positive electrode 14A and the negative electrode 14B. The change in the parameter due to the short circuit or the capacitive coupling between the positive electrode 14A and the negative electrode 14B is compared with the threshold value A1 to detect whether there is foreign metal X on the upper surface of the charging tray 1 or not. Inasmuch as the change caused in the parameter by the foreign metal X placed on the upper surface of the charging tray 1 is much greater than the change caused in the parameter by the mobile phone 2 placed on the upper surface of the charging tray 1, it is easy to tell apart the foreign metal X and the mobile phone 2 (or an object to be supplied with electric power) using the threshold value A1. When the foreign metal X is detected, the charging process is immediately stopped, or the supplied electric power is immediately reduced, and/or the user is immediately given a warning, thereby preventing the foreign metal X from being heated. Consequently, when the charging tray 1 is to feed the CE device by way of electromagnetic induction or magnetic resonance, it is possible to accurately detect foreign metal which is different from the CE device and to prevent the foreign metal from being unduly overheated.

Modifications, i.e., first through sixth modifications, of the exemplary embodiment will be described below. Those parts of the modifications which are identical to those of the exemplary embodiment are denoted by identical reference characters, and will not be described in detail below.

First Modification:

FIGS. 7A and 7B are views illustrative of a process of detecting foreign metal according to a first modification. According to the first modification, the process detects whether there is foreign metal X on the charging tray 1 by comparing a change in a given parameter with a predetermined threshold value, i.e., by comparing their magnitudes, as with the above exemplary embodiment. The process according to the first modification makes it possible to detect foreign metal X highly accurately even if the surface of the foreign metal X is oxidized or plated.

Specifically, the detecting circuit 111 holds, in addition to the threshold value A1, a threshold value A2 (second threshold value) which is different from (in the first modification, smaller than) the threshold value A1. The threshold value A2 serves as a threshold value for detecting foreign metal X having an oxide film or plated film (hereinafter referred to as "film Y") on its surface. The threshold value A2 is established in view of the fact that the foreign metal X is spaced from the surface S of the charging tray 1 by a distance that is equal to the thickness d2 of the film Y. As shown in FIGS. 7A and 7B, a change in an impedance Z1' and a change in a capacitance C1' at the time the foreign metal X with the film Y is placed on the charging tray 1 are smaller than the corresponding changes at the time the foreign metal X without the film Y is placed on the charging tray 1, but are sufficiently greater than those at the time the mobile phone 2 is placed on the charging tray 1 (Z1<Z1'<<Z2).

The detecting circuit 111 detects whether there is foreign metal X on the charging tray 1 or not using the threshold value A1 and also the threshold value A2 (A1>A2) which is established in view of the thickness d2 of the film Y, i.e., based on the comparison between the magnitude of a change in the parameter and the magnitudes of the threshold value A1 and the threshold value A2. Therefore, the detecting circuit 111 is capable of detecting foreign metal X free of a film Y and also foreign metal X with a film Y such as an oxide film or a plated film. When an AC voltage is applied between the positive and negative electrodes, the detecting circuit 111 can detect foreign metal X with the film Y highly accurately, e.g., a piece of metal such as stainless steel which can easily be oxidized.

As shown in FIG. 7C, even if the radiating surface (the surface S) of the charging tray 1, i.e., the surfaces of the positive electrodes 14A and the negative electrodes 14B, is covered with an oxide film or a plated film (referred to as "film Y'"), the detecting circuit 111 can accurately detect foreign metal X placed on the surface S. Specifically, the detecting circuit 111 detects whether there is foreign metal X on the charging tray 1 or not using the threshold value A1 and also a threshold value A3 (A1>A3) which is established in view of the thickness d3 of the film Y', i.e., based on the comparison between the magnitude of a change in the parameter and the magnitudes of the threshold value A1 and the threshold value A3.

Figure 8A:
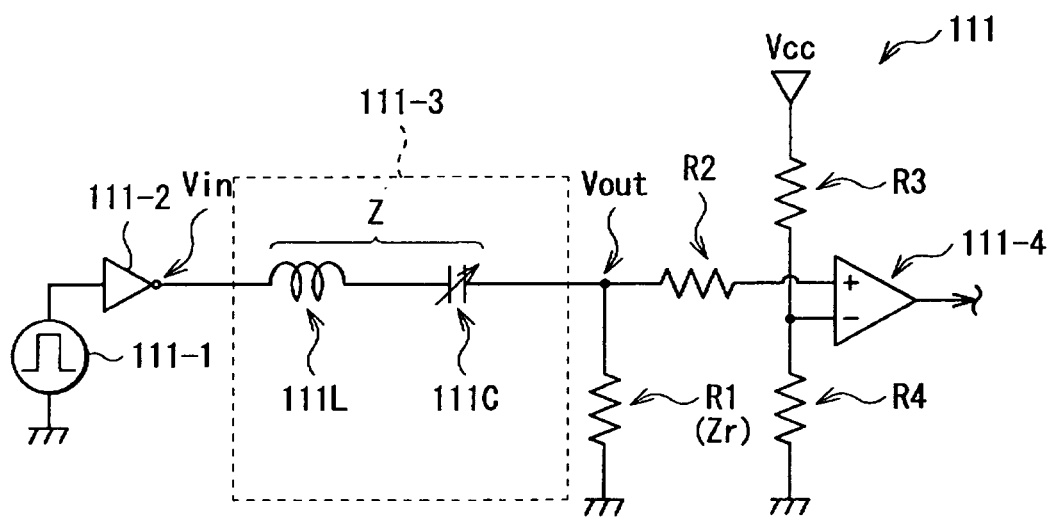
FIGS. 8A and 8B are circuit diagrams showing a detecting circuit according to a second modification.

Second Modification:

FIG. 8A is a circuit diagram of a detecting circuit 111 according to a second modification. The detecting circuit 111 according to the second modification includes an AC signal source 111-1, an inverter circuit (NOT gate) 111-2, a resonant circuit 111-3, resistors R1, R2, R3, R4, and a comparator 111-4.

The AC signal source 111-1 is a signal source (oscillating source) for outputting an AC signal having a predetermined frequency (resonant frequency f(0) to be described later). The inverter circuit 111-2 outputs a signal representing the opposite logic level to the AC signal output from the AC signal source 111-1.

The resonant circuit 111-3 includes an inductor 111L (inductive component) and a variable capacitor 111C (capacitive component). The resonant circuit 111-3 is a series-connected resonant circuit (series-connected LC resonant circuit) wherein the inductor 111L and the capacitor 111C are connected in series to each other. Specifically, the inductor 111L has an end connected to the output terminal of the inverter circuit 111-2 and another end to an end of the capacitor 111C. The capacitor 111C is a capacitor (capacitive component) formed between positive electrodes, e.g., the positive electrodes 14A, and negative electrodes, e.g., the negative electrodes 14B, of the charging tray 1.

Figure 8B:
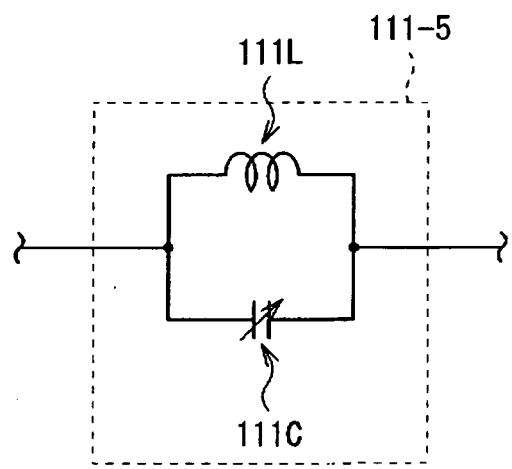

The detecting circuit 111 may alternatively employ another resonant circuit instead of the series-connected resonant circuit 111-3. Specifically, as shown in FIG. 8B, the detecting circuit 111 may include a parallel-connected resonant circuit 111-5 (parallel-connected LC resonant circuit) wherein the inductor 111L and the capacitor 111C are connected parallel to each other.

Each of the resonant circuits 111-3, 111-5 resonates at a resonant frequency f0 expressed by the equation (1) below, thereby generating and outputting an output voltage Vout based on an input voltage Vin.

$$f0 = \frac{1}{2\pi\sqrt{LC}} \quad (1)$$

The resistor R1, which has an impedance value of Zr, has an end connected to the other end of the capacitor 111C and an end of the resistor R2, and another end connected to ground. The other end of the resistor R2 is connected to a positive input terminal of the comparator 111-4. The resistor R3 has an end connected to the output terminal of a power supply Vcc and another end to an end of the resistor R4 and a negative input terminal of the comparator 111-4. The other end of the resistor R4 is connected to ground.

The comparator 111-4 compares a voltage applied to the positive input terminal thereof, i.e., a voltage corresponding to the voltage Vout output from the resonant circuit 111-3, and a predetermined constant voltage (threshold voltage) applied to the negative input terminal thereof for their magnitudes, and outputs the result of the comparison, which represents whether foreign metal is detected or not, from an output terminal thereof.

Figure 9A:
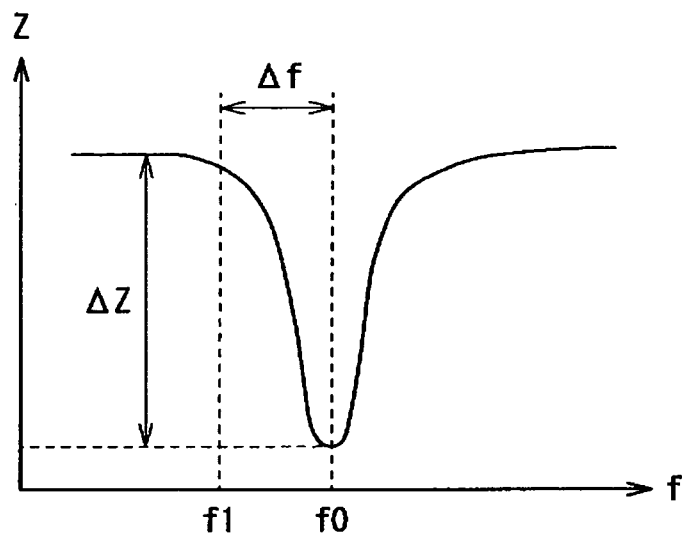
FIG. 9A is a diagram showing the relationship between the frequencies of an AC power supply and impedance values.
Figure 9B:
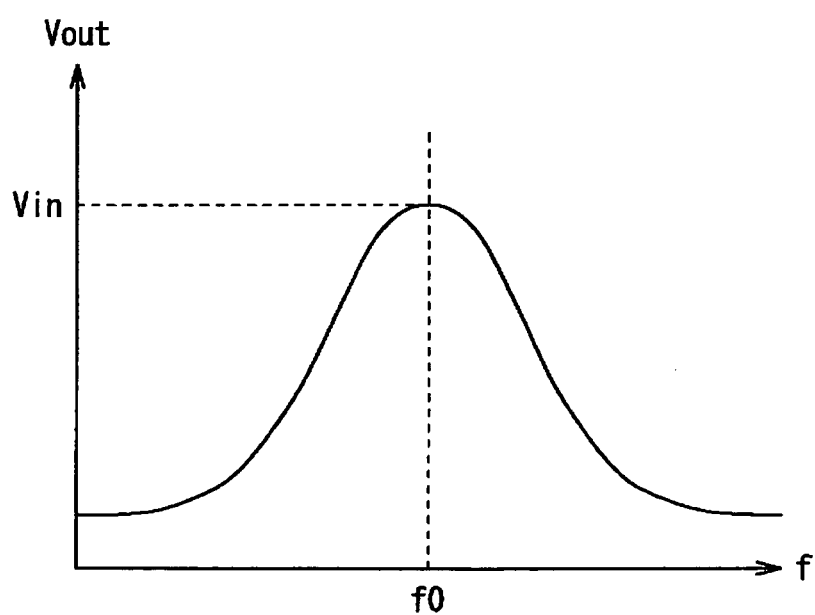
FIG. 9B is a diagram showing the relationship between the frequencies of an AC power supply and the output voltages from a resonant circuit.

The detecting circuit 111 according to the second modification increases a change in the impedance using the resonant circuit 111-3, 111-5. Specifically, as shown in FIGS. 9A, 9B the resonant circuit 111-3, 111-5 has a natural resonant frequency f0. The impedance Z of the resonant circuit 111-3, 111-5 and the output voltage Vout thereof have widely different values at frequencies near the natural resonant frequency f0 and other frequencies. For example, as shown in FIG. 9A, at the natural resonant frequency f0 and a frequency f1 which is different from the natural resonant frequency f0 by a frequency interval □f, the impedance Z has different values which are different from each other by □Z. When the resonant circuit 111-3, 111-5 does not resonate, i.e., at the frequency f1, the output voltage Vout has a value indicated by the equation (2) shown below. When the resonant circuit 111-3, 111-5 resonates, i.e., at the frequency f0, the output voltage Vout has a value indicated by the equation (3) shown below.

$$Vout = \frac{Zr}{Z + Zr} \cdot Vin \quad (2)$$

$$Vout = Vin \quad (3)$$

The detecting circuit 111 according to the second modification detects foreign metal based on a change in the parameter shown in FIGS. 9A and 9B, i.e., a change corresponding to the impedance difference ΔZ or a change corresponding to the output voltage difference indicated by the equations (2) and (3), using the resonant circuit 111-3, 111-5. Specifically, the frequency of the AC signal output from the AC signal source 111-1 is set to the resonant frequency f0 to cause the resonant circuit 111-3, 111-5 to resonate. Then, when foreign metal is placed on the charging tray 1, the capacitance C of the capacitor 111C, i.e., the impedance Z, is changed to stop resonating the resonant circuit 111-3, 111-5, thereby producing a large value of the parameter (the impedance Z or the output voltage Vout). In this manner, the comparator 111-4 can detect with increased sensitivity whether there is foreign metal is placed on the charging tray 1 or not.

According to the second modification, even if a change caused in the capacitance C of the capacitor 111C by foreign metal that is placed on the charging tray 1 is of a small value, e.g., a few pF, such a parameter change is greatly increased by the resonance of the resonant circuit 111-3, 111-5. Consequently, the detecting circuit 111 has an increased sensitivity with which to detect foreign metal, or in other words, can reduce a detection error.

The AC signal output from the AC signal source 111-1, which is used to detect whether there is foreign metal on the charging tray 1 or not, should preferably have a frequency, i.e., a resonant frequency f0, which is different from the frequency of the electric power that is transmitted from the charging tray 1 to the CE device, e.g., the mobile phone 2. The detecting circuit 111 is thus free of noise which would otherwise be produced due to the frequency of the electric power that is transmitted from the charging tray 1 to the CE device.

Figure 10:
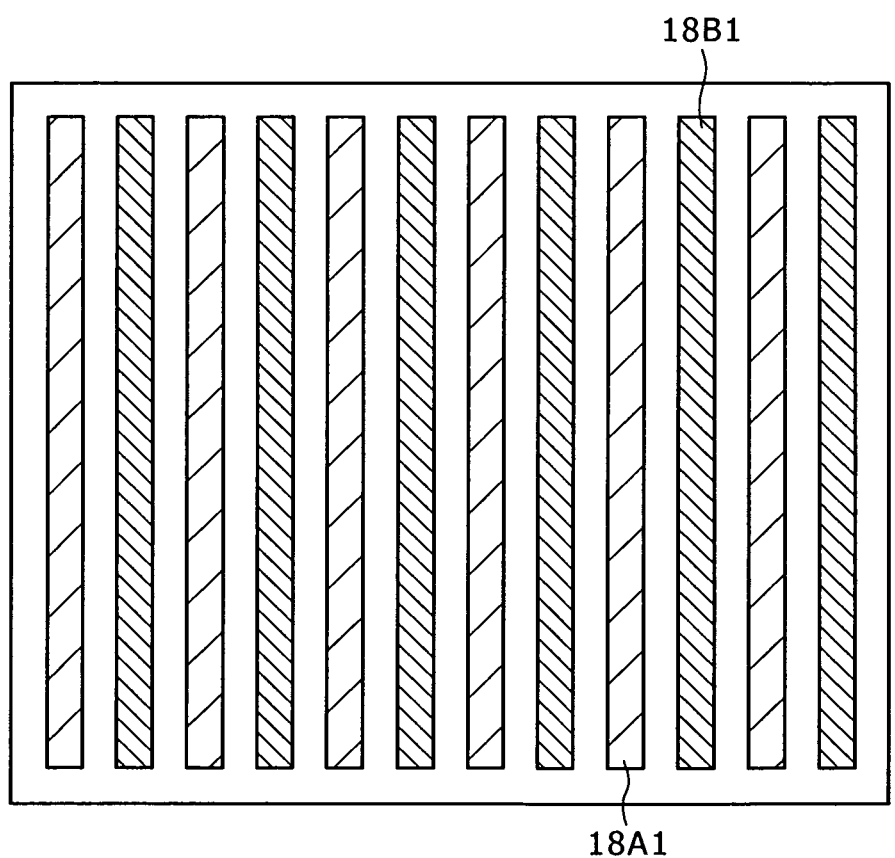
FIG. 10 is a plan view of an example of an electrode pattern according to a third modification.

Third Modification:

FIG. 10 is a plan view of an example of an electrode pattern according to a third modification. In the present exemplary embodiment, as electrode patterns for detecting foreign metal, the positive electrodes 14A and the negative electrodes 14B have dot shape as viewed in plan (and have pin shape as a whole). The electrode pattern according to the third modification includes a plurality of linearly shaped positive electrodes 18A1 and a plurality of linearly shaped negative electrodes 18B1, or a plurality of sets of positive electrodes 18A1 and negative electrodes 18B1, which extend along one direction and which are alternately arranged at spaced intervals along another direction perpendicular to the direction along which the positive electrodes 18A1 and the negative electrodes 18B1 extend, as viewed in plan. The positive electrodes 18A1 and the negative electrodes 18B1 extend through the antenna pattern layer 15 and the magnetic layer 16 as viewed in a cross-sectional plane. Each of the positive electrodes 18A1 and the negative electrodes 18B1 has an outer shape in the form of a thin sheet having a width perpendicular to the upper surface of the charging tray 1. The electrode pattern made up of the positive electrodes 18A1 and the negative electrodes 18B1 is also effective to detect foreign metal placed thereon based on a short circuit or capacitive coupling between adjacent ones of the positive electrodes 18A1 and the negative electrodes 18B1.

Figure 11A:
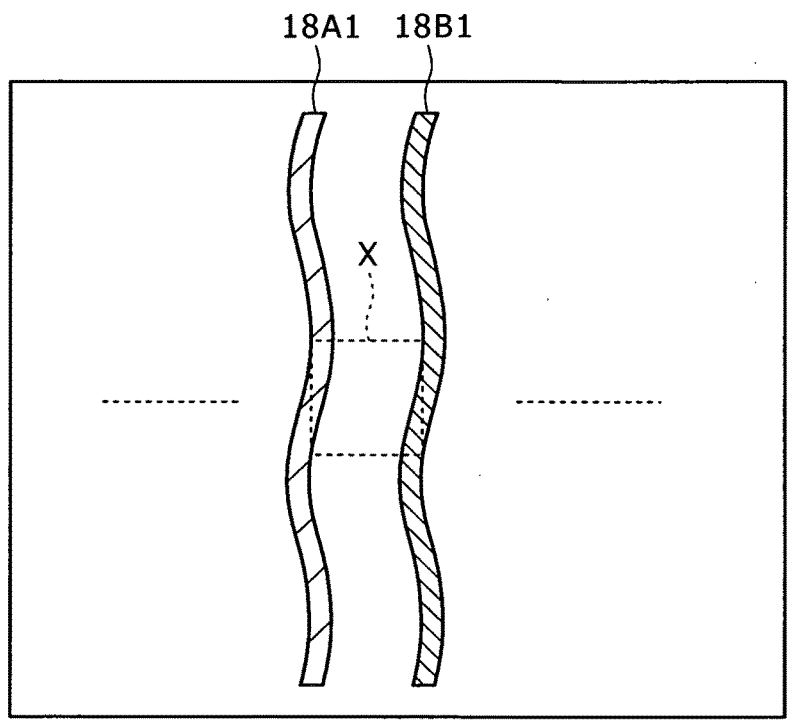
FIGS. 11A and 11B are plan views of other examples of the electrode pattern according to the third modification.
Figure 11B:
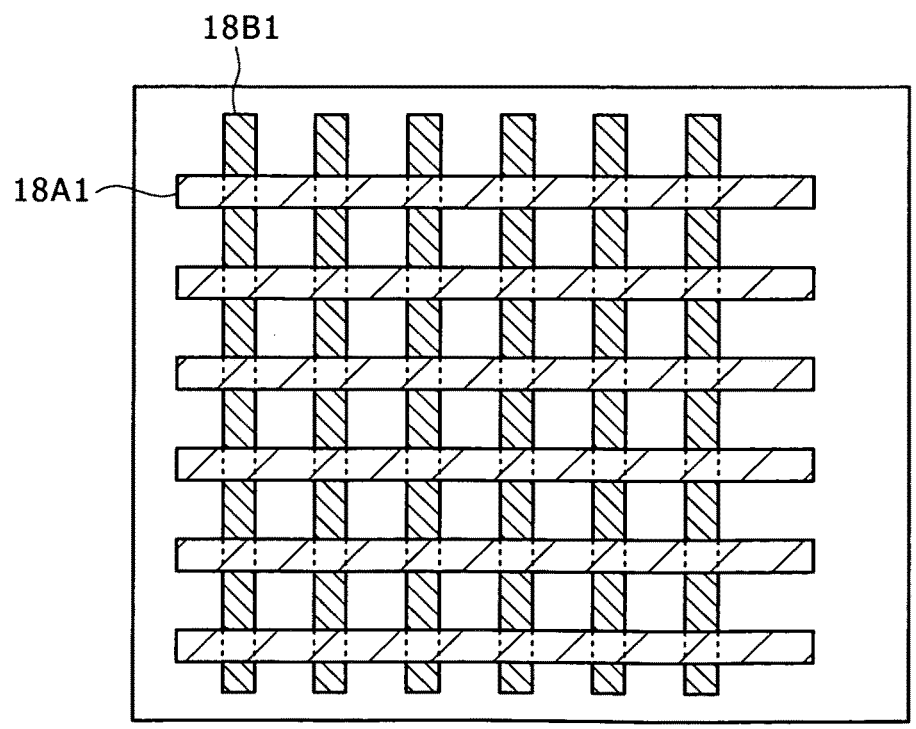

FIG. 11A shows an electrode pattern made up of a plurality of undulating positive electrodes 18A1 and a plurality of undulating negative electrodes 18B1 alternately arranged at spaced intervals. Since the undulating positive and negative electrodes 18A1, 18B1 allow foreign metal X to be placed across adjacent ones thereof more reliably than with the linearly shaped positive and negative electrodes 18A1, 18B1 shown in FIG. 10, the electrode pattern shown in FIG. 11A is more effective to detect the foreign metal X. FIG. 11B shows an electrode pattern made up of a plurality of linearly shaped positive electrodes 18A1 and a plurality of linearly shaped negative electrodes 18B1 which are arranged in a grid configuration at spaced intervals. The positive and negative electrodes 18A1, 18B1 are electrically insulated from each other at grid points where they cross each other.

Figure 12:
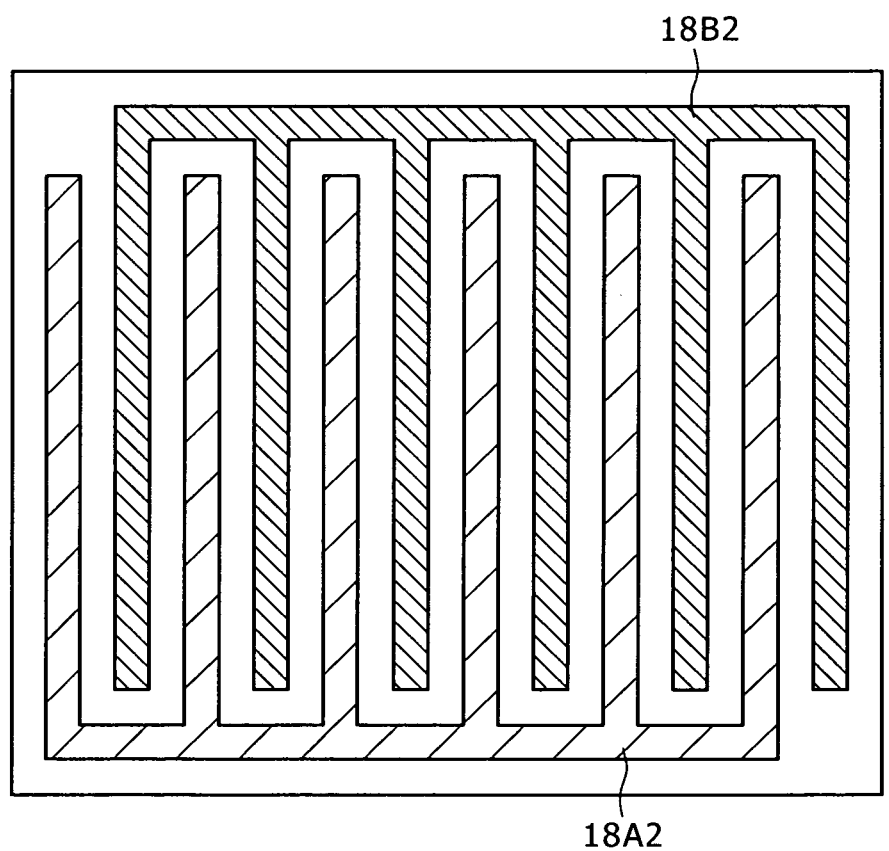
FIG. 12 is a plan view of an example of an electrode pattern according to a fourth modification.

Fourth Modification:

FIG. 12 is a plan view showing a planar configuration of an electrode pattern according to a fourth modification. The electrode pattern according to the fourth modification may be in the shape of an interdigitating pattern of combtoothed positive and negative electrodes, in addition to the dot shape (or pin shape) and the linear shape (or thin sheet shape) described above. Specifically, the electrode pattern according to the fourth modification includes a combtoothed positive electrode 18A2 and a combtoothed negative electrode 18B2, i.e., a set of combtoothed positive and negative electrodes 18A2, 18B2, which are arranged in an interdigitating pattern and spaced out of contact with each other, as viewed in plan. The positive electrode 18A2 and the negative electrode 18B2 extend through the antenna pattern layer 15 and the magnetic layer 16 as viewed in a cross-sectional plane. Each of the positive electrode 18A2 and the negative electrode 18B2 has a thickness in a direction perpendicular to the upper surface of the charging tray 1. The electrode pattern made up of the positive and negative electrodes 18A2, 18B2 is also effective to detect foreign metal placed thereon based on a short circuit or capacitive coupling between adjacent teeth of the positive and negative electrodes 18A2, 18B2. The electrode pattern according to the fourth modification is advantageous in that the layout of an interconnection pattern on the circuit board 17 is simple because only the positive and negative electrodes 18A2, 18B2 may be energized.

The combtoothed positive and negative electrodes 18A2, 18B2 may be constructed as a block, and the charging tray 1 may incorporate a plurality of such blocks to provide a plurality of pairs of combtoothed positive and negative electrodes 18A2, 18B2 for minimizing the parasitic capacitive component between the electrodes. The combtoothed positive and negative electrodes 18A2, 18B2 may be of an undulating shape or may be arranged in a grid configuration.

Figure 13:
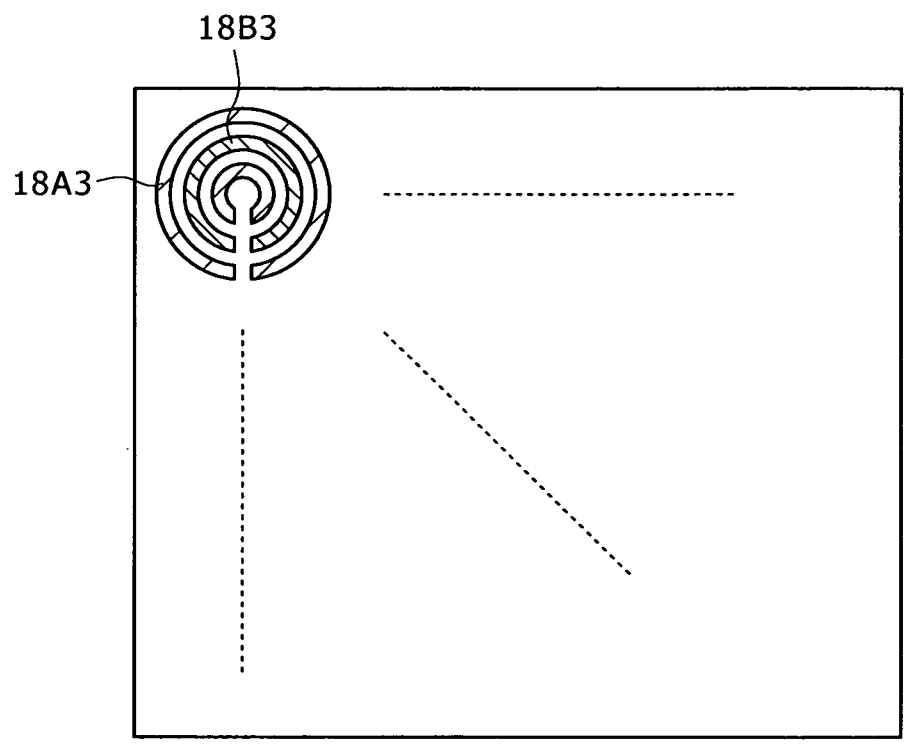
FIG. 13 is a plan view of an example of an electrode pattern according to a fifth modification.

Fifth Modification:

FIG. 13 is a plan view showing a planar configuration of an electrode pattern according to a fifth modification. The electrode pattern according to the fifth modification is a concentric pattern of alternate horseshoe-shaped, i.e., substantially U-shaped or ring-shaped, positive and negative electrodes 18A3, 18B3. The charging tray 1 has on its upper surface a plurality of electrode units each including a plurality of sets of positive and negative electrodes 18A3, 18B3. The electrode pattern made up of the positive and negative electrodes 18A3, 18B3 is also effective to detect foreign metal placed thereon based on a short circuit or capacitive coupling between adjacent ones of the positive and negative electrodes 18A3, 18B3.

Figure 14:
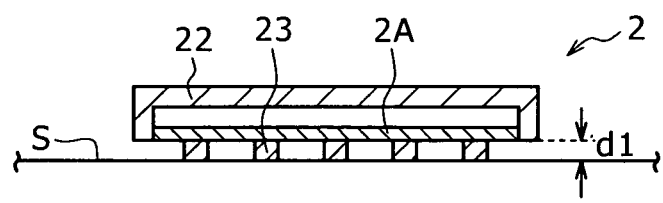
FIG. 14 is a cross-sectional view of a mobile phone according to a sixth modification.

Sixth Modification:

FIG. 14 is a cross-sectional view of an electronic device (mobile phone 2) according to a sixth modification. As shown in FIG. 14, the mobile phone 2 according to the sixth modification includes a casing 22 and a metal layer 2A (metal member) which is disposed at the bottom of the casing 22, but is not fully covered by the casing 22. The metal layer 2A has a lower outer surface exposed downwardly. The mobile phone 2 also includes a plurality of insulative teeth 23 disposed on at least a portion of the lower outer surface of the metal layer 2A.

When the mobile phone 2 is placed on the charging tray 1 with the insulative teeth 23 held against the surface S of the charging tray 1, the metal layer 2A is spaced a distance d1 from the surface S, i.e., the surface which radiates the electromagnetic wave or the magnetic field to detect foreign metal. Therefore, when the mobile phone 2 with the partly exposed metal layer 2A is charged by the charging tray 1, the mobile phone 2 is prevented from being detected or recognized in error as foreign metal.

The insulative teeth 23 may be replaced with an insulating layer or resin layer on at least a portion of the exposed lower outer surface of the metal layer 2A.

The exemplary embodiment and the modifications of the present disclosure have been described above. However, the present disclosure is not limited to the exemplary embodiment and the modifications, but various changes may be made to the exemplary embodiment and the modifications. For example, the layers which have been described above are not limited to the materials and thicknesses referred to above, but may be of different materials and thicknesses.

In the exemplary embodiment, the power feeding device according to the embodiment of the present disclosure is in the form of the charging tray 1 for charging small-size CE devices such as the mobile phone 2. However, the power feeding device according to the embodiment of the present disclosure is not limited to the charging tray 1 for home use, but is applicable to chargers for charging various electronic devices. The power feeding device according to the embodiment of the present disclosure is not limited to a tray configuration, but may be in the form of a stand for holding an electronic device, such as a cradle or the like.

In the exemplary embodiment, an AC voltage is applied between the positive and negative electrodes. However, a DC voltage may be applied between the positive and negative electrodes. However, it is preferable to apply an AC voltage between the positive and negative electrodes for detecting foreign metal having an oxide film or plated film on its surface.

Based on the comparison between the magnitudes of a change in the parameter and a threshold value, foreign metal on the charging tray 1 may be detected according to various processes other than the process described above. For example, foreign metal may be determined as being placed on the charging tray 1 if a change in the parameter is smaller than a threshold value. Such a threshold value may not be a fixed value, but may be a variable value which varies depending on an action made by the user or according to an automatic control process depending on the manner in which the charging tray 1 is used.

In the exemplary embodiment, the charging tray 1 is electrically connected to an external AC power supply by the power supply plug 13, so that the charging tray 1 can be supplied with electric power from the external AC power supply. However, the charging tray 1 may be supplied with electric power from a USB (Universal Serial Bus) power supply or from an external AC power supply through an AC adapter.

In the exemplary embodiment, the spirally shaped primary coil 10 in the upper surface of the charging tray 1 is illustrated as part of the power transmitting section. However, a helically shaped primary coil having a certain thickness perpendicular to the upper surface of the charging tray 1 may be used as part of the power transmitting section.

In the exemplary embodiment, the specific components of the charging tray 1 are illustrated above. However, the charging tray 1 may not have all the specific components described above, and may include other components.

The present disclosure contains subject matter related to that disclosed in Japanese Priority Patent Application JP 2010-232813 filed in the Japan Patent Office on Oct. 15, 2010, the entire content of which is hereby incorporated by reference.

It should be understood by those skilled in the art that various modifications, combinations, sub-combinations and alterations may occur depending on design requirements and other factors in so far as they are within the scope of the appended claims or the equivalents thereof.

What is claimed is:

1. A power feeding device, comprising:
a plurality of electrodes within an antenna pattern layer;
a power supply configured to apply a voltage between a first of the plurality of electrodes and a second of the plurality of electrodes;
a detector configured to measure the voltage, the measurement detecting an amount of change in a parameter based on the voltage applied between the first electrode and the second electrode, wherein the amount of change in the parameter is compared with a threshold value;
a coil within the antenna pattern layer, an electromagnetic wave being emissible from the coil;
a control circuit configured to adjust an amount of electric power based on whether the amount of change in the parameter is equal to or greater than the threshold value, the coil is configured to transform the electric power into the electromagnetic wave; and
a magnetic layer between a substrate and the antenna pattern layer, the magnetic layer is in contact with the substrate and the antenna pattern layer at opposite surfaces of the magnetic layer respectively;
wherein the plurality of electrodes extend into the magnetic layer,
wherein a portion of the antenna pattern layer is between the first of the plurality of electrodes and the second of the plurality of electrodes, a portion of the magnetic layer being between the first of the plurality of electrodes and the second of the plurality of electrodes.

2. A power feeding device, comprising:
a magnetic layer between a substrate and an antenna pattern layer in a cross-sectional view of the power feeding device;
an electrode in the magnetic layer, the electrode extends into the antenna pattern layer; and
a coil in the antenna pattern layer, the coil surrounds the electrode in a plan view of the power feeding device,
wherein a portion of the antenna pattern layer, that is disposed between the electrode and a portion of the coil, is a resin layer.

3. The power feeding device according to claim 2, wherein the magnetic layer is a material from a group consisting of at least one of an iron-based metal or a ferrite.

4. The power feeding device according to claim 2, wherein the magnetic layer has a high relative magnetic permeability.

5. The power feeding device according to claim 2, wherein the magnetic layer is configured to provide magnetic isolation between the antenna pattern layer and the substrate.

6. The power feeding device according to claim 2, wherein the substrate is a circuit board.

7. The power feeding device according to claim 2, wherein a winding of the coil is rectangular.

8. The power feeding device according to claim 2, wherein the coil is spirally shaped or helically shaped.

9. The power feeding device according to claim 2, wherein opposite surfaces of the magnetic layer touch the substrate and the antenna pattern layer respectively.

10. The power feeding device according to claim 2, further comprising:
a power supply configured to apply a voltage between the electrode and a different electrode, the different electrode is in the antenna pattern layer.

11. The power feeding device according to claim 10, further comprising:
a wire in the substrate, the wire is configured to electrically connect the power supply to the electrode.

12. The power feeding device according to claim 10, further comprising:
a detector configured to measure the voltage, the measurement detects an amount of change in a parameter.

13. The power feeding device according to claim 12, wherein the parameter is the voltage.

14. The power feeding device according to claim 12, wherein the parameter is an impedance between the electrode and the different electrode.

15. The power feeding device according to claim 12, wherein the parameter is a current between the electrode and the different electrode.

16. The power feeding device according to claim 12, wherein the detector is in the substrate.

17. The power feeding device according to claim 12, further comprising:
a control circuit configured to adjust an amount of electric power based on a determination that the amount of change is equal to or greater than a threshold value.

18. The power feeding device according to claim 17, wherein the control circuit is in the substrate.

19. The power feeding device according to claim 17, wherein the coil is configured to transform the electric power into an electromagnetic wave, the electromagnetic wave is emissible from the coil.

20. The power feeding device according to claim 12, wherein the detector is further configured to identify a presence or an absence of a foreign object on the antenna pattern layer based on the amount of change.

21. The power feeding device according to claim 20, wherein the electrode extends through the antenna pattern layer to the foreign object.

22. A power feeding system comprising:
   the power feeding device according to claim 2; and
   an electronic apparatus configured to wirelessly receive an electromagnetic wave.

23. The power feeding system according to claim 22, wherein the electronic apparatus is connectable to the power feeding device, the electronic apparatus is separable from the power feeding device.

24. The power feeding system according to claim 22, wherein identification information is exchanged between the power feeding device and the electronic apparatus.

25. The power feeding system according to claim 24, wherein the identification information is used to authenticate the power feeding device and the electronic apparatus.

* * * * *